United States Patent [19]

Chen

[11] Patent Number: 4,845,342

[45] Date of Patent: Jul. 4, 1989

[54] CIRCUIT FOR PROVIDING ELECTRICAL ENERGY TO A HEATABLE MEANS

[75] Inventor: Tung C. Chen, Villanova, Pa.

[73] Assignee: Therme, Inc., Wilmington, Del.

[21] Appl. No.: 141,134

[22] Filed: Jan. 6, 1988

[51] Int. Cl.[4] ............................................. H05B 1/02
[52] U.S. Cl. .................................... 219/501; 219/494; 219/506; 219/509; 219/499; 323/235
[58] Field of Search ............... 219/507, 509, 508, 501, 219/506, 505, 499, 497, 495, 491; 323/319, 235, 236; 307/117, 252 UA

[56] References Cited

U.S. PATENT DOCUMENTS

| | | | |
|---|---|---|---|
| 3,548,155 | 12/1970 | Rubindran | 219/497 |
| 3,684,171 | 8/1972 | Evalds et al. | 219/499 |
| 3,946,200 | 3/1976 | Juodikis | 219/499 |
| 4,086,466 | 4/1978 | Scharlack | 219/499 |
| 4,554,439 | 11/1985 | Cross et al. | 219/499 |
| 4,636,619 | 1/1987 | Sugimori | 219/501 |
| 4,639,611 | 1/1987 | Sticher | 219/499 |

Primary Examiner—M. H. Paschall
Attorney, Agent, or Firm—William E. Cleaver

[57] ABSTRACT

The present device includes a bridge circuit with a first intermediate terminal and a second intermediate terminal and with one leg of the bridge circuit being a heating element. Connected across the power lines of the bridge circuit is a main bidirectional switching circuit (having a gate element) which is turned on bidirectionally by control signals developed by an R-C circuit connected to the gate element. The resistors of the R-C circuit are for the most part integral components of two photoconductor isolator devices. These last mentioned resistors provide a low resistance after their associated LED's are turned on and the one of them whose associated LED turns off at the zero crossover remains at a low resistance value for a period of time after its associated LED's has turned off. In addition the present device includes a circuit to bypass the control signal which ordinarily would go to the main capacitor of the R-C circuit in the event that an overcurrent situation (e.g., a short circuit) occurs in the heating element circuit. The bridge circuit and the control signal circuitry (which is arranged across the bridge circuit) are designed so that the resistance of the heating element (which changes as the heating element heats up or cools off) acts as the sensing device to control or maintain the heat output at a predetermined temperature value.

13 Claims, 1 Drawing Sheet

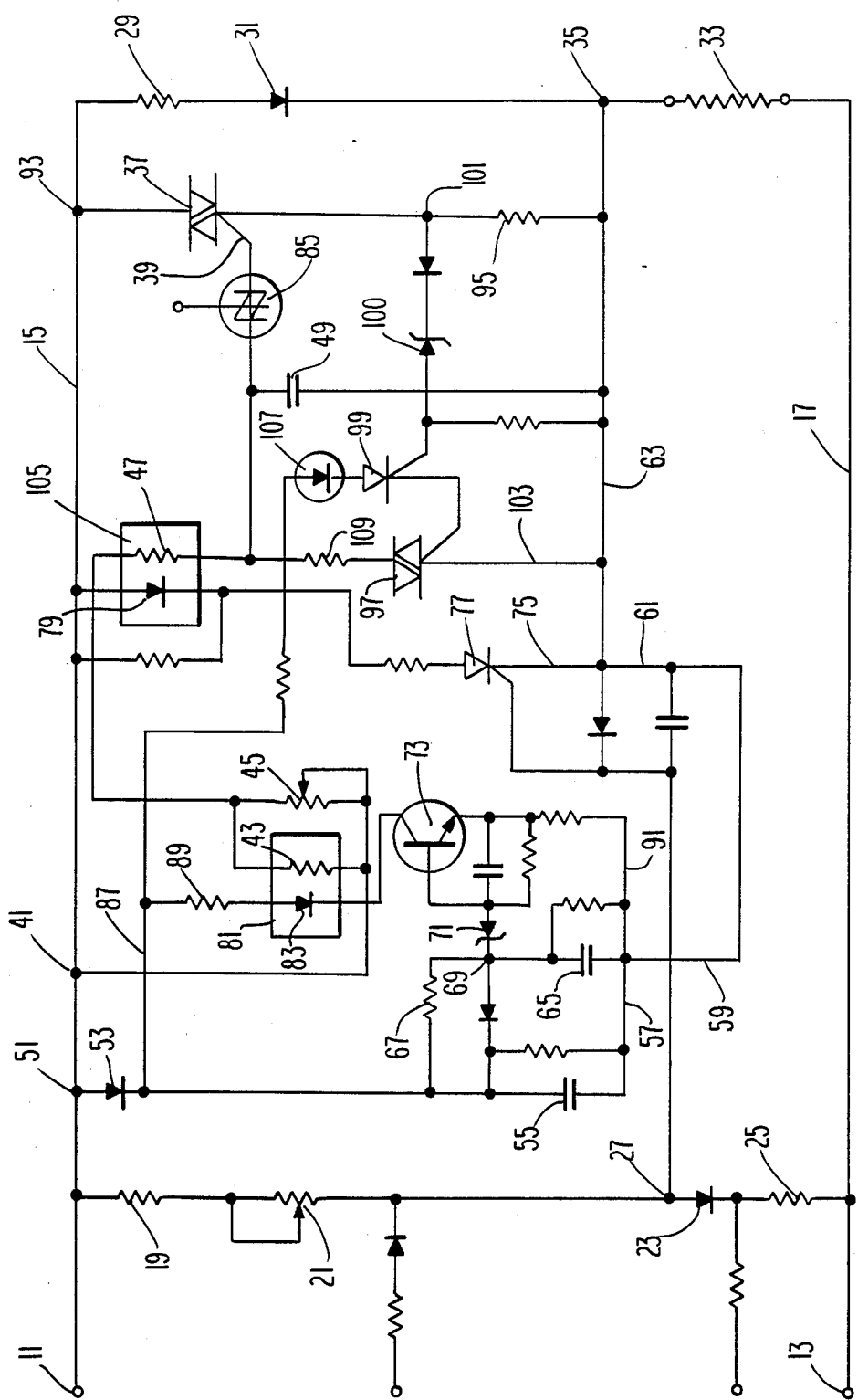

CIRCUIT FOR PROVIDING ELECTRICAL ENERGY TO A HEATABLE MEANS

BACKGROUND OF THE DISCLOSURE

In the field of electrical heating it has always been desirable to control the electrical energy going to the heating element so that (1) the heat remains constant for any given assignment and (2) the control circuit element or control circuit elements do not "burn out" by current overloading. In the past thermocouples or other separate temperature sensors have been employed extensively to measure the temperature at the heating element location and thus provide control signals to control the input electrical energy to the heating element. In the U.S. Pat. No. 3,679,871 a circuit is described which provides that the heating element is designed to act as a temperature sensor. The last mentioned circuit is designed so that as the temperature of the heating element increases (and therefore its resistance becomes higher) the difference in voltage across the bridge midpoints changes accordingly and a signal to the control circuitry connected across the bridge is provided. This arrangement permits the system to decrease the amount of current going to the heating element circuit and alternatively to increase the amount of current going to the heating element circuit depending upon the resistance value of the heating element. The circuit of U.S. Pat. No. 3,679,871 functions quite well but does have some drawbacks in that: it employs two silicon controlled rectifiers (SCR's) to effect the bidirectional current flow; it does not provide for protecting the main triac, or the two silicon controlled rectifiers or other circuit elements if there is an over current condition, such as a short circuit, at the heating element circuit; and it does not provide for a "soft start", i.e. a means for permitting the heating element circuit to gradually "warm up" during the initial start up. The "soft start" limits surges of power that normally occur during cold start of PTC elements. It also prevents early degradation of the heating element and reduces short circuit conditions which result from crystalline distortion due to quick temperature changes in the heating element circuitry.

SUMMARY OF THE DISCLOSURE

The present system has a bridge circuit of four legs with one leg of the four legs being the heating element circuit. The control circuitry between the midterminals of the bridge circuit includes a principal triac which provides the bidirectional electrical current flow through the heating element (the load). Connected to the gate of the principal triac is a diac or silicon bilateral switch (SBS) which is employed to require a firing voltage threshold for the gate. Connected to the diac is an R-C circuit which includes the main capacitor for storage of firing voltage control signals. At the zero crossover time, the principal triac is turned off and it is turned on during each half wave at the time that the voltage on the main capacitor builds up to a predetermined value (threshold) to fire the diac. The amount of current passing through the principal triac, to the heating element circuit, depends upon the time during the half wave period that the diac is fired, or turned on. Initially, there is large resistance present in the circuit path through which current flows to the main capacitor. In a preferred embodiment, during the initial period, or "soft start", the voltage developed on the main capacitor reaches the firing value about half way through the half wave period. Accordingly, in a preferred embodimen, the principal triac conducts for only one-half of each half of each cycle. Obviously, the firing time can be changed by changing the R-C values. After suitable "soft start" period, the resistance in the control signal current path is reduced and the voltage on the main capacitor reaches the threshold value earlier. Hence the principal triac conducts for substantially for the full time of each half wave period. In a preferred embodiment the resistors of the R-C circuit are principally the resistors of two photoconductor isolators. In a preferred embodiment the photoconductor isolators are manufactured by Clairex Electronics. One of the photoconductor isolators provides a memory to the resistor circuit in that when the light emitting diode associated with that photoconductor isolator turns off, due to the switching (alternating current) of the input power polarity, the resistor remains low in resistance value for a substantial time. Thus, a relatively substantial amount of current passes through the "memory" resistor in the opposite direction, from whence the current was passing in the previous half cycle. The last mentioned light emitting diode responds through an SCR to the difference of potential between the intermediate terminals of the bridge circuit. When the difference of potential between the intermediate terminals provides a relatively positive potential to the gate of the SCR, it is turned on and when the bridge is balanced, or the gate potential becomes relatively negative with respect to the cathode of the SCR, the SCR is turned off. The bridge becomes balanced, or the gate potential becomes negative with respect to the cathode, in response to the resistance of the heating element increasing. Accordingly, as the heating element heats up, its resistance increases and the last mentioned SCR is turned off. The foregoing causes the last mentioned LED to be turned off, (and because its associated resistor goes high in resistance), which severely reduces the control signal electrical current passing to the main capacitor. It follows that the electrical current passing through the principal triac will stop and the heating element will start to cool. As the heating element cools its resistance value reduces and the SCR which was turned off gets turned on. Thus the heating element plays the role of the temperature sensor. The LED of the second photo conductor isolator is connected through transistor circuitry into a circuit which develops a constant direct current source. Initially the transistor does not conduct but waits until the voltage across an associated capacitor reaches a predetermined value. Since the transistor does not initially conduct, the LED of the second photoconductor isolator is not turned on and its associated resistor remains high in resistance value. The high resistance just described limits the current to the main capacitor which assures a firing time which is about midpoint in the half wave period which in turn provides a "soft start." Finally the present system employs a second triac in series with a resistor which is capable of bypassing the control signal current which flows to the main capacitor in the event that the heating element experiences an overcurrent condition. The gate of the second triac is connected through the cathode and gate of a second silicon controlled rectifier which in turn is connected to a main power lead of the principal triac. In the event heavy currents flow through the principal triac, the second silicon controlled rectifier will get "turned on" and the current therethrough lights an LED to advise the operator of the overcurrent condition. At the same time the overcurrent condition turns the second triac on to bypass the control signal current which otherwise flows to the main capacitor. Since the threshold voltage does not develop on the main capacitor, the principal triac is prevented from firing within one cycle time thus preventing the principal triac and other circuitry from burning out.

The object and features of the present invention will be better understood in view of the following description which is taken in conjunction with the drawing. The drawing is a schematic diagram of the present circuit.

In the drawing there are shown input power terminals 11 and 13 which are connected to an alternating current input source. When the first input line 15 has a positive voltage polarity it follows that the second input line 17 has a negative voltage polarity and vice versa. There is a bridge circuit connected between the first input line 15 and the second input line 17. The bridge circuit includes resistor 19 and adjustable resistor 21, which are serially connected, making up one leg of the bridge circuit. A second leg is made up of diode 23 and resistor 25 which are also serially connected. Located between the first and second legs of the bridge circuit is a first intermediate terminal 27.

On the right hand side of the drawing there is shown a third leg of the bridge circuit made up of resistor 29 and diode 31 which are serially connected. The fourth leg of the bridge circuit is heating element 33. Connected between the heating element 33 and the third leg of the bridge circuit is a second intermediate terminal 35. All the circuitry between the two intermediate terminals 27 and 35 acts to control current transmitted to the heating element and further acts to provide a "soft start" to protect against an overcurrent condition such as a short circuit.

When the electrical alternating current power is applied to the terminals 11 and 13 and assuming that terminal 11 is positive and terminal 13 is negative, current flows through resistors 19 and 21 as well as through diode 23 and resistor 25. Accordingly a certain voltage potential is developed at intermediate terminal 27. The adjustment of the pot, or adjustable resistor 21, determines the voltage value at intermediate terminal 27, and that value principally determines the desired heat at heating element 33. In effect, the potentiometer 21 is analogous to the thermostat in the average home. At the same time, current flows from input line 15 through the resistor 29, through the diode 31, through the heating element 33 to the intermediate line 17. The current flowing through the heating element 33 provides an IR drop which develops a voltage value at the second input terminal 35. The resistance value of the resistor 29 is chosen (particularly with respect to the cold state of the heating element) such that initially there is a difference of potential between the intermediate terminal 27 and the intermediate terminal 35 with the intermediate terminal 27 having a voltage value which is more positive than the voltage value at the intermediate terminal 35. With the voltage at intermediate terminal 27 being more positive than the voltage at intermediate terminal 35, the SCR 77 will be turned on and current will pass from line 15, through LED 79, through SCR 77, along line 75, along line 63, through heating element 33. Accordingly, virtually, as soon as the power is applied to terminals 11 and 13, the LED 79 is lighted and the resistance value of resistor 47 is reduced. Also initially current flows from the terminal 41, through the resistors 43 and 45, through the "memory" resistor 47 to the main capacitor 49 to charge the main capacitor 49 (through the heating element 33). Initially a limited amount of current flows through the last mentioned path because the resistor 43 is in a very high resistance condition. In addition, current flows from the terminal 51, through the diode 53 to charge up the capacitor 55, the remainder of that circuit being through the line 57, through the line 59, through the line 61 and line 63 to the heating element 33. Current passing through the diode 53 not only charges the capacitor 55 but also charges the capacitor 65 through the resistor 67. The resistor 67 and the capacitor 65 provide an RC time constant delay in order to delay the voltage buildup at point 69. A voltage buildup at point 69 is necessary in order to cause the zener diode 71 to conduct, which in turn causes the transistor 73 to conduct.

The series of events is such that initially the difference of potential between the intermediate terminal 27 and the intermediate terminal 35 is sufficient to cause the SCR 77 to conduct. In response, electrical current is passed from the input line 15, through the light emitting diode 79, through the silicon controlled rectifier 77, along line 63 through the heating element 33. The foregoing results in the light emitting diode 79 being transformed into its lighted condition which acts on resistor 47 to lower the resistance. The lowered resistance of resistor 47 enables current to pass from terminal 41, through the resistors 45 and 43 to the main capacitor 49. However, since LED 83 is not lighted, the resistor 43 is very high in resistance value and the adjustable resistor 45 is set at such a value that only a limited amount of current will pass through the resistor 47 to the main capacitor 49. As described above the limited current flow to the main capacitor 49 triggers the diac 85 late in the half wave period and therefore the triac 37 provides current to the heating element for about one half of each cycle. The operation provides for a "warm up" time, i.e., a time without full power being applied to the heating element. As mentioned earlier, the photoconductor isolator 81, which is made up of the light emitting diode 83 and the resistor 43, acts as the "soft start" circuit for the system. In a preferred embodiment, the RC time constant provided by the resistor 67 and capacitor 65 is for approximately 85 seconds and the time for limiting current to the heating element 33 is approximately 27 seconds. The capacitor 65 does not have to be at full charge to cause the zener diode 71 to conduct and hence while the R-C time constant is 85 seconds in one third of that time or less, the zener diode 71 will conduct and thus the transistor 73 will conduct.

When the transistor 73 gets turned on there is current flow from the terminal 51, through the diode 53, along the line 87, through the resistor 89, through the light emitting diode 83, through the transistor 73, along the line 91, to line 59, along line 61, along line 63, through the heating element 33. When the light emitting diode 83 is transformed into its lighted condition it acts to reduce the resistance value of the resistor 43. Hence heavier current flows from the terminal 41, through the resistor 43, through resistor 47 to quickly charge up the capacitor 49. The quickly charged capacitor 49 causes the diac to fire and provide a control signal, in pulse form, to the triac 37. In response the triac 37 conducts heavily from the terminal 93, through the resistor 95, and through heating element 33. It becomes apparent then that during the half cycles in which the line 15 is positive and the input line 17 is negative the current flow is as just described.

It should be noted that the bypass triac 97 and silicon controlled rectifier 99 are not in the conducting state because the difference of potential between the point 101 and the lower power lead line 103 of the triac 97 is not sufficient to cause zener diode 100 to conduct. When zener diode 100 conducts, it causes the triac 97 and the silicon controlled rectifier 99 to go into their conducting states.

At the start of the other half of the cycle, i.e. when the input line 17 goes positive and the input line 15 goes negative, the triac 37 is turned off at the zero crossover. Since the "memory" resistor 47 is yet low in resistance value and the resistor 43 remains low in resistance value, the capacitor 49 charges in a reverse fashion through the resistor 47, through the resistor 43 and to the terminal 41. It will be recalled that even though during this second half of the cycle the LED 79 is turned off, the resistor 47 remains low, because of the nature of the photoconductor isolator 105. In effect, there is a memory characteristic about the photoconductor isolator 105 which is taken advantage of in this particular circuitry. It will also be recalled that LED 83 remains turned on because there is a DC source developed by the capacitor 55. During the second half of the cycle, when the polarities of the input lines reverse, the diode 53 prevents current flow therethrough and hence the capacitor 55 provides a half wave DC supply across the LED 83 as well as to the zener diode 71 to keep the transistor 73 conducting. By keeping the resistors 47 and 43 in a relatively low resistance condition, the main capacitor 49 quickly charges in the reverse sense and the triac 37 is triggered early in the second half of the cycle. Since the triac 37 is in the conducting state, current passes through the heating element 33, through the resistor 95, through the triac 37 to the input line 15. Hence during each second half of the cycles there is electrical current supplied to the heating element. The circuit continues in the operation as just described on the positive and negative halves of the cycles as considered from the input line 15.

In the event that the heating element 33 degenerates into a short circuit condition or into an overcurrent condition, then heavy currents will be demanded through the main triac 37. Simultaneously therewith, the terminal 35 becomes very negative with respect to line 15 (assuming that input line 15 is in the positive state for this part of the description). Hence for an instant the full voltage is applied to the resistor 95. It follows that there is a difference of potential between 101 and the main power lead 103 which exceeds a predetermined value and which turns on the silicon controlled rectifier 99 as well as the triac 97. The turning on of the SCR 99 causes the LED 107 to become lighted and that light warns the operator that there is an overcurrent condition. The light 107 remains lighted until the power is shut off. In addition, the turning on of the triac 97 bypasses the current which would have gone to the main capacitor 49. Since the main capacitor 49 does not develop a triggering voltage, the principal triac 37 is not turned on. Since the principal triac 37 cannot be turned on, it will not be burned out due to heavy currents therethrough. I have found that triac 37 is turned off within one cycle.

Now during normal operations the circuit wants to regulate the amount of heat provided by the heating element 33, wants to anticipate the need for reducing the electrical energy thereto or increasing the electrical energy thereto. The foregoing is accomplished by the potential developed between the intermediate terminals 35 and 27. As described earlier, initially the intermediate terminal 27 is at a relatively more positive potential than the potential at the input terminal 35. Accordingly, the silicon controlled rectifier 77 is turned on and that causes the LED 79 to be lighted which in turn reduces the resistance value of the resistor 47 to provide a substantial amount of control current to the capacitor 49. After the "soft start" period elapses, full control current is passed to the main capacitor 49 which in turn triggers the triac early to provide full power to the heating element. As the heating element 33 generates more heat its resistance value goes up and as the voltage value at terminal 35 increases, the difference of potential between terminal 27 and terminal 35 is decreased. When the difference of potential between terminal 27 and terminal 35 is decreased to a balanced state or reversed, the silicon controlled rectifier 77 will be turned off. As was described above when SCR 77 is not conducting, the triac 37 is fired later and less current is passed to the heating element whereby the heating element cools to some degree. As the heating element 33 responds to the lesser amount of current and therefore to some degree cools off, its resistance value likewise decreases and hence eventually the difference of potential between the intermediate terminals 27 and 35 reverses with the voltage at terminal 27 going relatively positive. In response, the SRC 77 will be turned on and the LED 79 is lighted thereby reducing the resistance of the resistor 47. When the resistance of the resistor 47 is reduced there is a greater amount of current flowing to the capacitor 49. The increased current to the capacitor 49 causes the main triac 37 to be triggered earlier and hence there is more electrical energy to the heating element 33.

The various other components of the circuit such as the resistor across the capacitor 55 provides a discharge path for that capacitor. The resistor across the capacitor 65 provides a discharge path for that capacitor. The diode across the resistor 67 provides a discharge path to discharge capacitor 65 in the event the system is stopped and then restarted. The capacitor and the resistor across the base and emitter of the transistor 73 act to protect the transistor from being falsely triggered on. The diode and the capacitor connected across the gate and the cathode of the silicon controlled rectifier 77 act to prevent the SCR 77 from being turned on by noise and to protect the SCR 77 from a shorted condition when the voltage at intermediate terminal 35 becomes more positive than the voltage at terminal 27.

It becomes apparent then in view of the foregoing description that the present circuit controls the heat provided by the heating element 33, anticipates when more or less electrical energy should be provided to the heating element 33, provides a "soft start" for initially heating up the heating element 33, provides a memory aspect which enables the bidirectional current flow to occur without using two silicone controlled rectifiers in the power sense, provides circuitry to warn the operator of a short circuit and provides bypass circuitry to keep the critical components from burning out during an overcurrent condition. All of the foregoing represent advances in this heating element control circuitry art.

I claim:

1. A control circuit for variably applying time-wise A.C. power to a heating element comprising in combination: first and second input lines respectively connected to first and second terminals of an electrical power source and arranged with respect to said electrical power source such that when said first input line has a positive electrical potential, said second input line has a relatively negative electrical potential and alternatively when said first input line is a relatively negative electrical potential, second input line has a positive electrical potential; first circuit means and second circuit means serially connected across said first and second input lines and having a first intermediate terminal located between said first circuit means and said second circuit means; third circuit means and heating circuit means serially connected across said first and second input lines and having a second intermediate terminal located in between said third circuit means and said heating circuit means; first switchable bidirectional electric current conducting means having first and second power lead means respectively connected to said first input line and to said second intermediate terminal, said first bidirectional electrical conducting means having gate means which respond to signals applied thereto to cause said first switchable bidirectional electrical current conducting means to conduct current from said second input line through said heating circuit means and therefrom in a first direction to said first input line through said first power lead means and alternatively in a second direction, through said second power lead means, to said second intermediate terminal and therefrom through said heating circuit means to said second input line; storage circuitry means to develop a control voltage signal, including means to vary current transmitted for storage at said storage circuitry means, said storage circuitry means connected to said gate means and connected between said second intermediate terminal and said first input line to cause different amounts of current to flow through said first switchable bidirectional electrical current conducting means in said first direction and in said second direction in response to different voltage signals being developed at said signal storage means.

2. A circuit according to claim 1 wherein said bidirectional electrical conducting means is triggered to conduct in response to a predetermined voltage stored at said storage circuitry means and wherein said means to vary current transmitted for storage is connected to said first input line and to both said first and second intermediate terminals so that when said first intermediate terminal is positive with respect to said second intermediate terminal said means to vary current transmitted for storage operates in a mode to conduct quantities of current to said storage circuitry means which cause said predetermined voltage to be stored early in any half cycle of power applied to said first and second input lines.

3. A circuit according to claim 2 wherein said means to vary current transmitted for storage includes a circuit to delay the time for providing amounts of current to said storage circuitry means and thereby cause said predetermined voltage to be stored relatively late in any half cycle of power applied to said first and second input lines.

4. A circuit according to claim 2 wherein said means to vary current transmitted for storage includes at least one photoconductor isolator having a light emitting diode and an associated resistor and whose light emitting diode is connected to said first input line and which light emitting diode is connected through first circuitry means to both said first and second intermediate terminals.

5. A circuit according to claim 2 wherein said means to vary current transmitted for storage includes first and second photoconductor isolator devices and a means to develop a direct current supply, with said first photoconductor isolator having a light emitting diode connected to said first input line and through first circuitry to both said first and second intermediate terminals and wherein said second photoconductor isolator has a light emitting diode connected to said means to develop a direct current supply and through second circuitry means to said first and second intermediate terminals.

6. A circuit according to claim 1 wherein there is further included a second switchable bidirectional electrical current conducting means connected to said storage circuitry means as well as to said second intermediate terminal whereby when said heating element experiences an overcurrent condition, the current which otherwise would pass to said storage circuitry means will pass through said switchable bidirectional electrical current conducting means to bypass said storage circuitry means.

7. A circuit according to claim 5 wherein said second circuitry means includes a transistor whose gate is connected to a zener diode and includes a resistor-capacitor circuit connected to said zener diode whereby when the capacitor of said resistor-capacitor circuit holds a particular triggering voltage value said zener diode conducts to turn on said transistor.

8. A circuit according to claim 7 wherein the resistance value of the resistor of said resistor-capacitor circuit and the capacitance value of the capacitor of said resistor-capacitor circuit are each chosen to provide a time delay before said transistor is caused to conduct whereby a soft start is provided with respect to heating up said heating circuit means.

9. A circuit according to claim 1 wherein said means to vary current transmitted for storage includes a photoconductor isolator which has a light emitting diode and an associated resistor and wherein said light emitting diode is lighted during one half of a first a.c. power cycle to lower the resistance value of said associated resistor and wherein the resistance value of said associated resistor remains relatively low during the following half of said first a.c. power cycle when said light emitting diode is not lighted whereby current is transmitted in said first and second directions respectively in succeeding half cycles through said associated resistor.

10. A control circuit for variably applying time-wise A.C. power to a heating element comprising in combination: first and second input lines respectively connected to first and second terminals of an electrical power source from whence there is provided alternating current power; a bridge circuit means connected across said first and second input lines, said bridge circuit means comprising at least first, second, and third resistance means which constitute respectively first, second, and third legs of said bridge circuit means and a heating circuit means constituting the fourth leg of said bridge circuit means, with a first intermediate terminal means being located between said first and second legs and a second intermediate terminal being located between said third and fourth legs; first triac means series connected with a first resistor and with said last mentioned series connected circuit being connected between said first input line and said second intermediate terminal, said first triac having a gate means; main capacitor means circuitry connected to said gate means of said triac and to said second intermediate terminal; first photoconductor isolator means having a first light emitting diode and an associated resistor means and connected to said main capacitor to provide a triggering voltage signal to said main capacitor and therefore to said gate of said triac; first silicon controlled rectifier means connected to said first light emitting diode and to said first and second intermediate terminals means whereby in response to a particular difference of potential between said first and second intermediate terminal means said silicon control rectifier means is turned on which causes said first light emitting diode to be turned on which in turn lowers the resistance of the resistor associated with said first light emitting diode to cause said triggering voltage signal to occur during each half cycle while said alternating current power is applied to said first and second input lines.

11. A circuit according to claim 10 wherein there is further included a second photoconductor isolator circuit means having a second light emitting diode and an associated resistor means and wherein said second photoconductor isolator means is connected to a transistor circuit means which when it is turned on causes said second light emitting diode to conduct and thus lower the resistance value of the associated resistor of second light emitting diode and wherein the associated resistor of said second light emitting diode is connected to the associated resistor of said first light emitting diode whereby when said first and second light emitting diodes are in their lighted states, the triggering voltage developed by said main capacitor is developed relatively early in each half wave of said alternating current power provided to said first and second input lines.

12. A circuit according to claim 11 wherein there is further included a resistor-capacitor circuit connected through a zener diode to said transistor circuit means to delay the triggering time of said transistor circuit means whereby the associated resistor of said second light emitting diode will remain high in resistance value and therefor delay the triggering voltage developed by said main capacitor.

13. A circuit according to claim 10 wherein there is included a second triac connected to the associated resistor of said first light emitting diode and to said second intermediate terminal, and wherein said second triac has a gate means connected to the serially connected resistor between said first triac and said second intermediate terminal whereby in the event that said heating circuit means experiences an overcurrent condition, said second triac will be turned on to conduct current therethrough which otherwise would be transmitted to said main capacitor and thereby render said first triac means nonconducting.

* * * * *